United States Patent
Fuchs

(10) Patent No.: US 10,953,488 B2
(45) Date of Patent: Mar. 23, 2021

(54) LINEAR FRICTION WELDING MACHINE

(71) Applicant: pewag austria GmbH, Kapfenberg (AT)

(72) Inventor: Franz Fuchs, Kapfenberg (AT)

(73) Assignee: pewag austria GmbH, Kapfenberg (AT)

(*) Notice: Subject to any disclaimer, the term of this patent is extended or adjusted under 35 U.S.C. 154(b) by 391 days.

(21) Appl. No.: 16/063,206

(22) PCT Filed: Dec. 5, 2016

(86) PCT No.: PCT/EP2016/079788
§ 371 (c)(1),
(2) Date: Jun. 15, 2018

(87) PCT Pub. No.: WO2017/102407
PCT Pub. Date: Jun. 22, 2017

(65) Prior Publication Data
US 2020/0269348 A1    Aug. 27, 2020

(30) Foreign Application Priority Data

Dec. 18, 2015 (DE) .......................... 102015122314.7

(51) Int. Cl.
*B23K 20/12* (2006.01)
*B29C 65/06* (2006.01)
(Continued)

(52) U.S. Cl.
CPC ...... *B23K 20/1205* (2013.01); *B29C 65/0618* (2013.01); *B29C 65/7841* (2013.01);
(Continued)

(58) Field of Classification Search
CPC .. B23K 20/1205; B23K 20/121; B23K 20/10; B23K 20/12–1215;
(Continued)

(56) References Cited

U.S. PATENT DOCUMENTS 3,714,509 A    1/1973    Coleman et al.
4,368,662 A    1/1983    Steinhart
(Continued)

FOREIGN PATENT DOCUMENTS

| CA | 2854972 A1 * | 6/2013 | ......... B23K 20/1205 |
| CA | 2854975 A1 * | 6/2013 | ......... B29C 65/0618 |

(Continued)

*Primary Examiner* — Kiley S Stoner
(74) *Attorney, Agent, or Firm* — Christensen, Fonder, Dardi & Herbert PLLC

(57) ABSTRACT

A linear friction welding machine comprising a compression unit and an oscillator unit, each having a clamping holder for a workpiece. Both clamping holders are configured such that workpieces are held with the surfaces thereof to be welded, aligned and facing each other. The clamping holder of the compression unit is linearly movable relative to the clamping holder of the oscillator unit, and the latter is movable in an oscillating manner at right angles transversely with respect to the direction of travel of the compression unit and fixed to ends of vertical and horizontal supports which can be deflected laterally in a sprung manner in the oscillation direction, the other ends of which are anchored rigidly on supporting bodies. The supports are flexible under deflection in the oscillation direction but are designed to resist buckling when the clamping holders are loaded in the direction of travel of the compression unit.

20 Claims, 2 Drawing Sheets

(51) Int. Cl.
  *B29C 65/78* (2006.01)
  *B29C 65/00* (2006.01)

(52) U.S. Cl.
  CPC ...... *B29C 66/1142* (2013.01); *B29C 66/8242* (2013.01); *B29C 66/83221* (2013.01); *B23K 20/121* (2013.01)

(58) Field of Classification Search
  CPC .. B23K 20/1285–1295; B29C 65/0618; B29C 65/7841; B29C 66/1142; B29C 66/8242; B29C 66/83221; B29C 66/5261
  USPC ............ 228/112.1–114.5, 2.1–2.3; 156/73.5
  See application file for complete search history.

(56) References Cited

U.S. PATENT DOCUMENTS

| | | | | |
|---|---|---|---|---|
| 5,518,562 | A * | 5/1996 | Searle | B23K 20/129 156/580 |
| 5,813,593 | A * | 9/1998 | Galaske, Jr. | B23K 20/1205 228/112.1 |
| 2003/0201305 | A1* | 10/2003 | Trask | B23K 20/1205 228/112.1 |
| 2004/0256439 | A1 | 12/2004 | Pfeiler | |
| 2005/0127140 | A1* | 6/2005 | Slattery | B23K 20/1215 228/112.1 |
| 2006/0157538 | A1 | 7/2006 | Crasser | |
| 2006/0220599 | A1* | 10/2006 | Siegler | B29C 66/71 318/114 |
| 2007/0084539 | A1* | 4/2007 | Junker | B29C 66/841 156/73.1 |
| 2007/0101838 | A1 | 5/2007 | Semmlinger et al. | |
| 2008/0185420 | A1* | 8/2008 | Swallow | B23K 37/08 228/125 |
| 2010/0269479 | A1 | 10/2010 | Cerjak et al. | |
| 2011/0186616 | A1* | 8/2011 | Cai | B23K 20/10 228/110.1 |
| 2013/0139968 | A1* | 6/2013 | Johnson | B23K 20/1205 156/350 |
| 2013/0255619 | A1* | 10/2013 | Mizuno | B23K 11/093 123/193.5 |
| 2014/0050519 | A1* | 2/2014 | Oiwa | B23K 20/129 403/270 |
| 2014/0338841 | A1* | 11/2014 | Johnson | B23K 20/10 156/580.1 |
| 2015/0020951 | A1* | 1/2015 | Trabandt | B29C 66/8322 156/73.6 |
| 2016/0288247 | A1* | 10/2016 | Sweeting | B23K 20/12 |
| 2017/0036298 | A1* | 2/2017 | Johnson | B23K 20/1205 |
| 2017/0050262 | A1* | 2/2017 | Sato | B23K 20/227 |
| 2020/0086420 | A1* | 3/2020 | Gorski | B29C 65/0618 |
| 2020/0086421 | A1* | 3/2020 | Johnson | B23K 20/1205 |

FOREIGN PATENT DOCUMENTS

| | | | | |
|---|---|---|---|---|
| CA | 2854977 A1 * | 6/2013 | ............ | B23P 15/006 |
| DE | 1 947 470 A | 4/1971 | | |
| DE | 29 15 418 A1 | 10/1980 | | |
| DE | 34 33 519 C1 | 1/1986 | | |
| DE | 273 357 A3 | 11/1989 | | |
| DE | 41 02 750 C1 | 4/1992 | | |
| DE | 92 00 239 U1 | 4/1992 | | |
| DE | 200 17 224 U1 | 3/2002 | | |
| DE | 10260465 B3 * | 2/2004 | ............ | B23K 20/129 |
| DE | 20 2004 009 909 U1 | 12/2005 | | |
| DE | 20 2013 007 317 U1 | 12/2014 | | |
| GB | 1 310 819 | 3/1973 | | |
| JP | 2002-153975 A | 5/2002 | | |
| JP | 2008238111 A * | 10/2008 | ........ | B29C 65/0618 |
| WO | WO-2005035227 A1 * | 4/2005 | ............ | B23K 20/121 |
| WO | WO 2013/085962 A1 | 6/2013 | | |

* cited by examiner

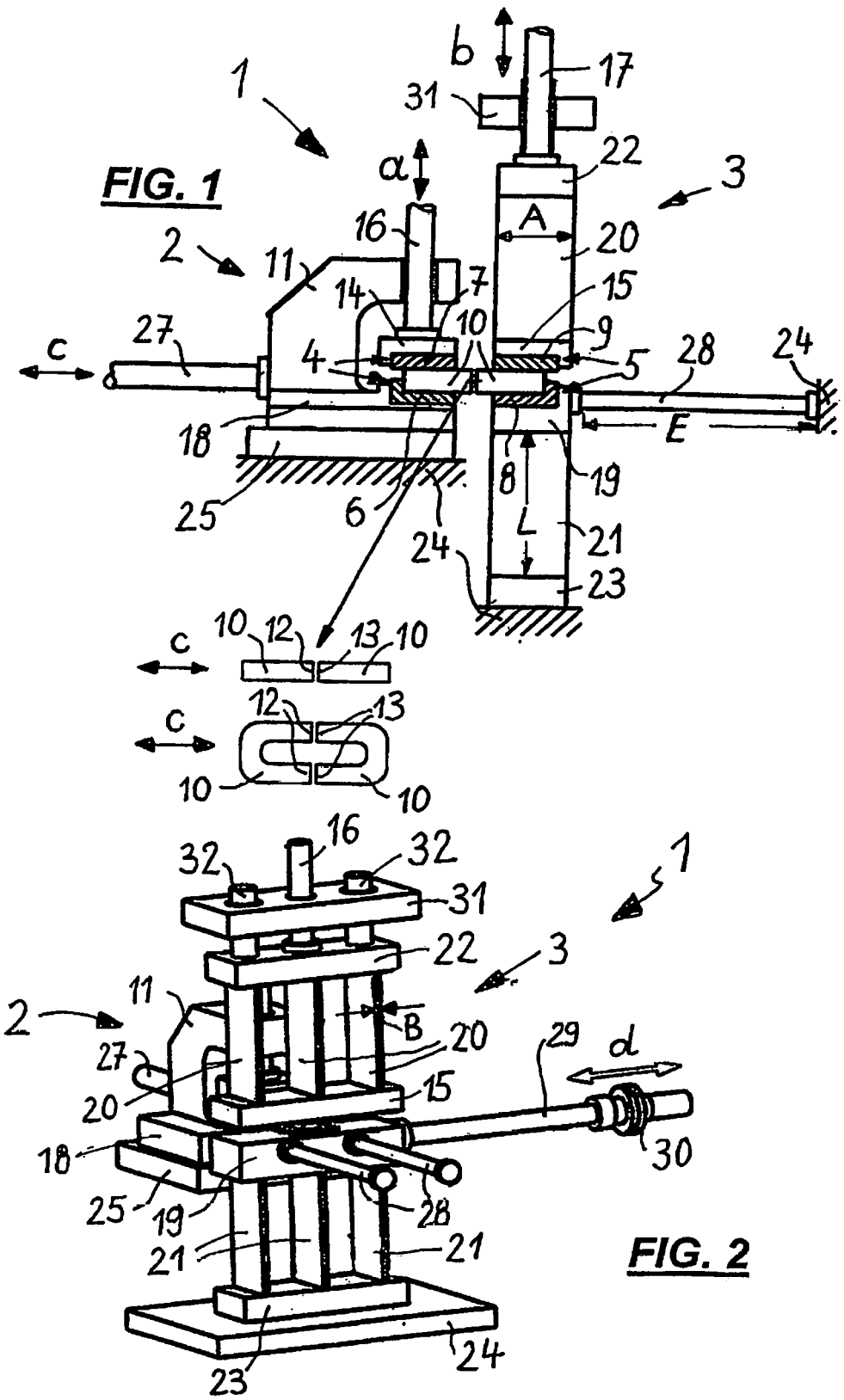

LINEAR FRICTION WELDING MACHINE

PRIORITY CLAIM

The present application is a National Phase entry of PCT Application No. PCT/EP2016/079788, filed Dec. 5, 2016, which claims priority from German Patent Application Number 102015122314.7, filed Dec. 18, 2015, the disclosures of which are hereby incorporated by reference herein in their entirety.

FIELD OF THE INVENTION

The invention relates to a linear friction welding machine which allow the welding of two workpieces to each other by means of the welding method of linear friction welding.

BACKGROUND OF THE INVENTION

Friction welding methods, which were first developed over the course of past 50 years or so, are based on the principle that two pressed together surfaces which are to be welded and which execute a relative movement to each other are heated increasingly as a result of the friction which occurs in the process, wherein upon reaching a sufficient degree of heating of these surfaces the local pressure buildup which is required for achieving a weld is created as a result of a subsequent upsetting or compression of the surfaces against each other.

In the case of the friction welding method which is customarily used in this case, it is the so-called rotational friction welding, in which the abutting friction surfaces of the workpieces execute a coaxial rotational movement relative to each other, as a result of which the desired heating of the friction surfaces takes place. In this case, however, on the friction surfaces an uneven heating occurs inside the respective friction surface owing to the different angular speeds over the cross section of the respective friction surface, with the consequence of an also uneven strength distribution in the weld points, wherein only rotationally symmetrical cross sections can be welded to each other.

Whereas rotational friction welding has been used increasingly in many industrial fields for several decades (DE 29 09 267 B2, DE 34 33 519 C1, DE 20 2004 009 909 U1, DD 273 357 A3, DE 1 947 470 A, WO 2006/000330 A1), linear friction welding, in which the welding surfaces to be interconnected execute a linear movement relative to each other and parts which are rectangular in cross section can also be welded to each other, has only slowly found its way into industrial manufacture.

So, a method and a device for the linear friction welding of end surfaces of long parts, especially rails, is known from EP 1 459 833 A1, wherein here at least one of the two part ends is moved in an oscillating manner for creating friction. This is achieved by the clamping means, in which one of the two parts to be connected is clamped in each case, being set in an oscillating eccentric motion after their abutment via a common drive shaft and an adjustable eccentric suspension of each clamping means and the heating in the end surfaces of the parts to be connected is created by this. For carrying out the welding process, in this case, however, upon reaching the corresponding friction temperature, an axially aligning at-rest position of the clamping means is required in order to achieve the desired cross-sectionally conforming welding of the two ends of the parts to be welded. For the welding, a pressure application to the two surfaces to be interconnected is then finally carried out, the so-called "upset blow", wherein in the description of this document it remains open as to which way this upset blow is to be carried out.

This known friction welding machine may certainly able to be used for the friction welding of the end surfaces of two parts with large longitudinal extent, e.g. rails inter alia, with profiled cross sections, but is costly owing to the translational relative movement, initiated in the friction surface, of the end surfaces of the parts to be interconnected by means of a corresponding eccentric drive of the clamping means, which clamps the ends of the parts, via a corresponding motor-driven rotational axis and cannot be used in a practical manner for carrying out a linear friction welding of relatively small cross sectional areas, such as when welding parts of chain links to each other. Also, the eccentric drive used here does not permit the generation of a high oscillation frequency, which limits the production speed.

SUMMARY OF THE INVENTION

Based on this, the invention is now focused on providing a linear friction welding machine which is suitable for the welding of especially also parts with relatively small cross sectional areas, have an uncomplicated and relatively simple construction and at the same time also allow a high production speed.

The linear friction welding machine according to the invention has an upsetting unit and an oscillator unit, each of which is provided with a clamping holder for a workpiece and both clamping holders are provided so that workpieces clamped there in each case face each other by their surfaces which are to be welded and are kept in alignment with each other, wherein the clamping holder of the upsetting unit can travel linearly relative to that of the oscillator unit and the latter can move back and forth in an oscillating manner perpendicularly to the travel direction of the upsetting unit and is fastened to the ends of vertical and horizontal supports which can be laterally elastically deflected in the oscillation direction, the other ends of which supports are rigidly anchored in each case on support bodies, wherein the supports are designed to be flexible during deflection in the oscillating direction, but buckle-resistant in the travel direction of the upsetting unit during loading of the clamping holder.

The linear friction welding machine according to the invention first of all comprises, as essential constructional devices, an upsetting unit and an oscillator unit, wherein a clamping holder for insertion and clamping of a workpiece is associated with each of these two units. In this case, the two clamping holders are designed and attached so that clamped workpieces are held there in each case with their surfaces which are to be welded facing each other and oriented toward each other, i.e. axially aligned with each other. In this case, the clamping holder of the upsetting unit can be moved linearly relative to the clamping holder of the oscillator unit, wherein the workpiece which is held in the clamping holder of the upsetting unit is moved with its end surface to be welded relative to the end surface of the workpiece which is held in the clamping holder of the oscillator unit, maintaining the axially parallel alignment of both end surfaces with each other.

The oscillator unit is designed in the invention so that together with the clamping holder attached to it can be moved back and forth in an oscillating manner perpendicularly and transversely to the linear travel direction of the upsetting unit. In this case, its clamping holder is rigidly fastened to the ends of vertical and horizontal supports which can be laterally elastically deflected in the oscillating direction, the other ends of which are similarly rigidly anchored on support bodies and designed so that they demonstrate a flexible behavior during deflection in the oscillating direction, but are buckle-resistant in the travel direction of the upsetting unit during loading of the clamping holder which is connected to it. This means that these supports in the vibrating direction, that is to say in the oscillating direction, offer little bend resistance, whereas perpendicularly thereto, that is to say in the travel direction of the clamping holder of the upsetting unit, their bending behavior is rigid and designed with large bending resistance. A "buckle-resistant" design of the supports is fulfilled when its buckling safety (corresponding to the ratio of buckling force to effective force) lies at least within the range of between 5 and 10.

In this case, the vertical and horizontal supports can be designed in any form which is suitable for such a bending behavior, however especially preferably the vertical supports are provided in the form of rail-like beams and the horizontal supports are provided in the form of support bars.

In the case of rail-like beams, that is to say in a form in which the width of the rail is significantly greater than its thickness, the bending resistance in the direction of the thin rail width is basically low, but in the direction perpendicularly thereto the vertical supports have a rigid and buckle-resistant behavior.

In the case of the supports, which bring about a supporting of the clamping holder of the oscillator unit in the horizontal direction, the desired bending behavior is preferably achieved with a design of these supports in the form of support bars. In the case of such horizontal bars, the supporting of the corresponding support acts in the horizontal direction, that is to say in the longitudinal direction of the support bar (corresponding to the linear travel direction of the upsetting unit), wherein there is a very strong support effect in this direction since a support bar usually demonstrates a very flexurally rigid, buckle-resistant behavior in its longitudinal direction. On the other hand, such support bars, however, are relatively flexible and elastic in their bending behavior perpendicularly to their longitudinal extent, that is to say as seen in the oscillating direction of the oscillator unit in the case of the linear friction welding machine according to the invention, wherein the value of the bending resistance in this direction is determined in the main by the material of the support bar.

The supports can consist of any material which is suitable for a functional behavior, but most especially preferably are produced from a suitable steel, for example a high strength heat-treatable steel, e.g. 42 GrMo 4, which allows the cross sections in use to be of particularly small design.

In the case of the linear friction welding machine according to the invention, horizontal supports, which are of bar-like design, are preferably used. The dimensioning of these bars depends on the size of the linear friction welding machine and of the parts which are to be welded and also on the material being used for the bars. In a test machine used by the applicant for the welding of chain links, the bars had a length of 40 cm, whereas the vertical supports being used were designed with a length of 35 cm. They are selected from their shape and their material so that the amplitude of the oscillating translational movement of the oscillator device is indeed dependent on the workpiece which is to be welded, but in any case is not more than 2.5 mm at a frequency of not more than 100 Hz.

The number of horizontal and vertical supports which are used in the linear friction welding machine according to the invention is selected corresponding to the designated operating area of this machine, wherein in principle it is advantageous, however, if provision is made in each case for at least two vertical supports which are parallel to each other and at least two horizontal supports which are parallel to each other.

Preferably, vertical supports are arranged so that by means of them the clamping holder of the oscillator unit is supported vertically both in the downward direction as well as in the upward direction.

Especially preferably, in the invention each clamping holder is also designed so that it comprises a lower holder part and an upper cover part, between which an accommodated workpiece can be clamped in a non-positively and/or positively locking manner, wherein for inserting or removing the workpiece the upper cover part of each clamping holder can especially preferably be moved or removed in the vertically upward direction.

An especially preferred embodiment of the invention also involves both the lower holder part as well as the upper cover part of the clamping holder of the oscillator unit being connected in each case to vertical supports and the lower holder part also being connected to the horizontal supports, wherein the latter support the clamping holder on its side facing away from the upsetting unit.

It is furthermore preferred if the clamping holder of the upsetting unit is attached to a retaining arm which can be moved linearly relative to the clamping holder of the oscillator unit.

For executing the translational movement of the clamping holder of the oscillator unit, this is preferably connected to a hydraulic pulsator for its back and forth movements, wherein in the case of the design of the clamping holder in a lower holder part and an upper cover part the lower holder part is advantageously connected to this pulsator. In this case, during transmission of the oscillating movement from the pulsator to the lower holder part of the clamping holder, the upper cover part, which from the top clamps the workpiece held in the clamping holder, is also moved during the oscillation, maintaining its clamping position of the lower holder part.

More preferably, the hydraulic pulsator is connected via a connecting rod, which is oriented in the oscillation direction, to the lower holder part of the clamping holder of the oscillator unit, preferably also with the interposition of a coupling, and in its turn is fastened to a machine frame of the linear friction welding machine according to the invention.

As a hydraulic pulsator, use is preferably made of type which during operation can be operated with an adjustable amplitude of 2.5 mm maximum and with an adjustable frequency of 100 Hz maximum, as a result of which a large operating range of the linear friction welding machine according to the invention can be covered.

It is also preferred if the upper cover part of each clamping holder, for its vertical lifting, is connected via an operating rod to a hydraulic cylinder which is attached to the machine frame of the linear friction welding machine, wherein the vertical supports of the upper cover part of the clamping holder of the oscillator unit are especially preferably rigidly anchored on a common holder which in its turn is fastened to the operating rod for the vertical lifting of the upper cover part of the clamping holder. By upward movement of the holder, all the vertical supports of the upper cover part of the clamping holder on the oscillator unit can be lifted at the same time so that a quick insertion or removal of a workpiece from the lower holder part of the clamping holder is possible.

In the invention, the support bodies of the vertical and horizontal supports of the lower holder part of the clamping holder of the oscillator unit are preferably formed by the machine frame or they are supported directly on this. In any case, it is ensured that the vertical and horizontal supports of the oscillator unit are always rigidly mounted on them.

It is furthermore preferred if in the invention the upsetting unit, for its linear travel, is connected to a hydraulic operating cylinder via which a workpiece held in the clamping holder of the upsetting unit can be pressed, under an adjustable pressing on pressure, against a workpiece held in the clamping holder of the oscillator unit, wherein a pressing on pressure in the range of between 10 N/mm$^2$ and 250 N/mm$^2$, especially preferably in the range of between 30 N/mm$^2$ and 50 N/mm$^2$, is preferably set.

In an advantageous embodiment, provision is made in the linear friction welding machine according to the invention for a central control device which serves for controlling all the operations of the individual machine elements which are to be carried out during operation of the machine and especially controls the engaging and disengaging of the pulsator, the linear travel of the upsetting unit, the pressing on of the workpiece held in its clamping holder against the workpiece held in the clamping holder of the oscillator unit, the execution of the concluding upsetting process and also the opening and closing of the cover parts for the insertion or removal of the workpieces which are to be welded or are welded.

The linear friction welding machine according to the invention fundamentally has the great advantage that with regard to its oscillating parts it uses no mechanical joints at all, such a ball bearings or slide bearings, of which it is known that in the case of high oscillation frequency and load they have only a relatively short service life. Rather, the oscillator unit of the linear friction welding machine according to the invention manages without such bearings and operates with wear-free, durable, flexibly elastic mechanical elements which conduct the occurring oscillating movements and at the same time also support the pressures initiated in the friction surfaces as well as the forces released during the upset blow. This therefore leads to a construction which is especially economical and efficient and at the same time is also able to be installed in a comparatively simple manner and also allows high oscillation frequencies without any problem.

In addition to workpieces which consist of one or more cross sections, such as chain links, also frame-like workpieces, e.g. window frames, and finally also workpieces with a complex geometry, can be welded on the linear friction welding machine according to the invention, wherein for this only a corresponding adaptation of the machine with its clamping holders to the workpieces to be welded has to be undertaken in each case.

BRIEF DESCRIPTION OF THE DRAWINGS

The invention is explained in more detail below by way of example with reference to the attached drawings. In the drawing:

FIG. 1 shows a basic side view of a linear friction welding machine according to the invention;

FIG. 2 shows a perspective view of the linear friction welding machine from FIG. 1, in the direction of view toward its front side (right hand machine side in FIG. 1);

DETAILED DESCRIPTION

Figure 3:
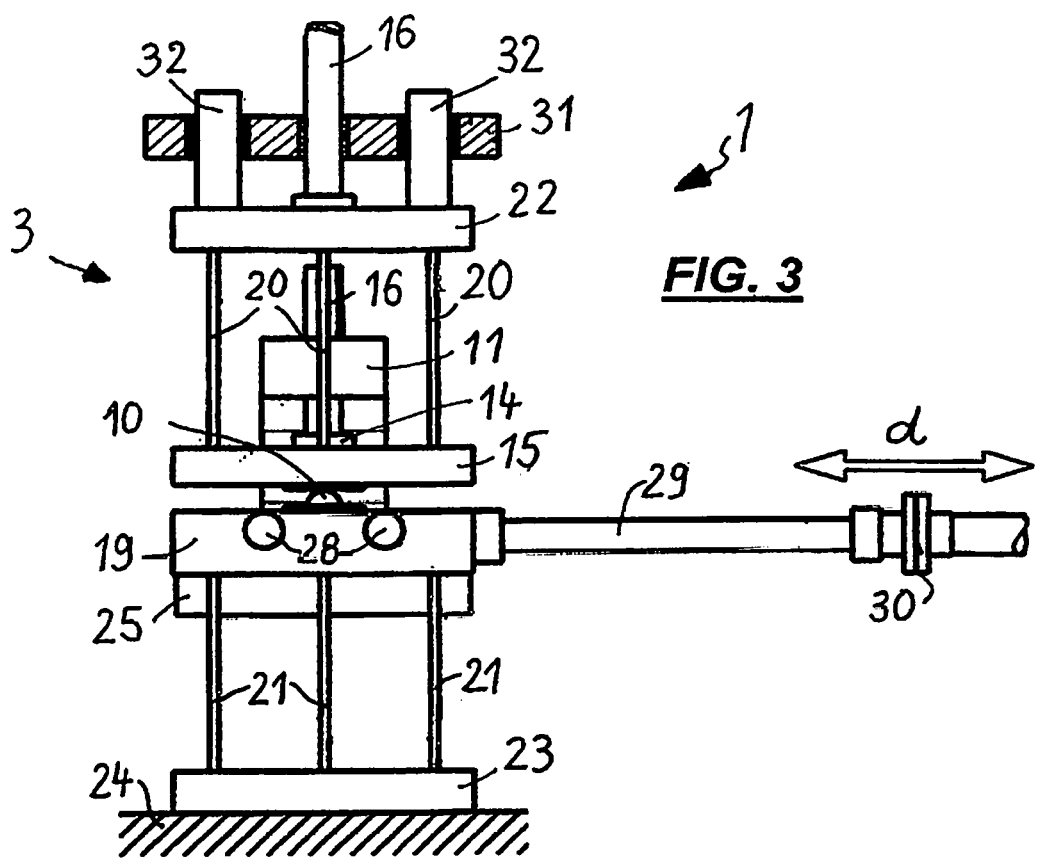
FIG. 3 shows a front view of the linear friction welding machine according to FIG. 1 (seen in the direction of view A in FIG. 1)

Shown in the figures is an embodiment of a linear friction welding machine according to the invention, specifically in a side view (FIG. 1), a front view (FIG. 3) and also in two perspective views which show the linear friction welding machine in two positions which are rotated anticlockwise by 90°.

In the figures, the same parts are also provided with the same designations.

First of all, the view of FIG. 1 may be dealt with, in which a linear friction welding machine 1, which comprises an upsetting unit 2 and also an oscillator unit 3, is shown in side view.

In this case, the upsetting unit 2 is provided with a clamping holder 4 and the oscillator unit 3 is provided with a clamping holder 5.

The clamping holder 4 comprises a lower holder part 6 and the clamping holder 5 comprises a lower holder part 8, in which in each case a workpiece 10 which is to be welded is inserted, wherein each of the inserted workpieces 10, by its side facing the workpiece 10 in the respectively other clamping holder 4 or 5, projects slightly beyond the clamping holder 4 or 5 in which it is accommodated.

In addition to the lower holder part 6 or 8 in each case, the clamping holder 4 of the upsetting unit 2 comprises an upper cover part 7 and the clamping holder 5 of the oscillator unit 3 comprises an upper cover part 9, wherein each upper cover part 7 and 9, with workpieces inserted in the clamping holders 4 and 5, clamp the respectively associated workpiece 10 from its upper side against the associated lower holder part 6 or 8 and in this way hold it in a fixed manner.

Each of the upper cover parts 7 and 9 is in its turn attached in an associated holder 14 or 15 which in its turn can be moved upward via a vertically upwardly moving operating rod 16 or 17 for opening the clamping holders 4 or 5 so that either tools 10 can be inserted into the relevant clamping holder 4 or 5 or already welded workpieces 10 can be removed from the clamping holders 4 and 5.

Each operating rod 16 and 17 is in this case connected to a corresponding drive device (not shown in the figures) which is preferably designed in each case in the form of a hydraulic cylinder and is fastened to a machine frame 24 (shown only in a basic manner in the figures) of the depicted linear friction welding machine 1.

Whereas the upper holder 14 of the clamping holder 4 of the upsetting unit 2 is connected directly to the lower end of its operating rod 16, as is evident for example from FIG. 1, the upper holder 15 of the clamping holder 5 of the oscillator unit 3 is not connected directly to the lower end of its operating rod 17. Rather, in this case three vertically extending rail-like supports 20, which are parallel to each other, are interposed (cf. FIGS. 2 and 3) and by their respectively lower ends are rigidly fastened to the holder 15 and by their respectively upper ends are rigidly fastened to a transversely extending holder 22 which b its upper side is connected in the middle to the lower end of the operating rod 17.

Just as the upper holder 15, in which the cover part 9 of the clamping holder 5 of the oscillator unit 3 is seated, is rigidly fastened to the lower ends of the vertical supports 20, the lower holder 19 of the holder part 8 of the oscillator unit 3 is also supported in its turn in the downward direction via three also parallel rail-like vertical supports 21 (cf. FIGS. 2 and 3). These supports 21 are rigidly fastened by their upper ends to the underside of the holder 19 and by their lower ends are rigidly mounted on a support block 23 which in its turn is supported on a section of the machine frame 24, outlined only in a basic manner in the figures, of the linear friction welding machine 1.

A support bracket 11 of the upsetting unit 2 is seated on a baseplate 25 (FIGS. 1 and 4), which in its turn is fastened in a suitable manner to the machine frame 24. In this case, the support bracket 11 is attached on the baseplate 25 in a linearly movable manner in the direction toward the oscillator unit 3 or away from this, as is indicated in FIG. 4 by the representation of longitudinal guide rails 26 which engage in corresponding guide slots and which are movably guided in a respectively adjacent holder 18 and via these holders 18 are retained on the baseplate 25.

Figure 4:
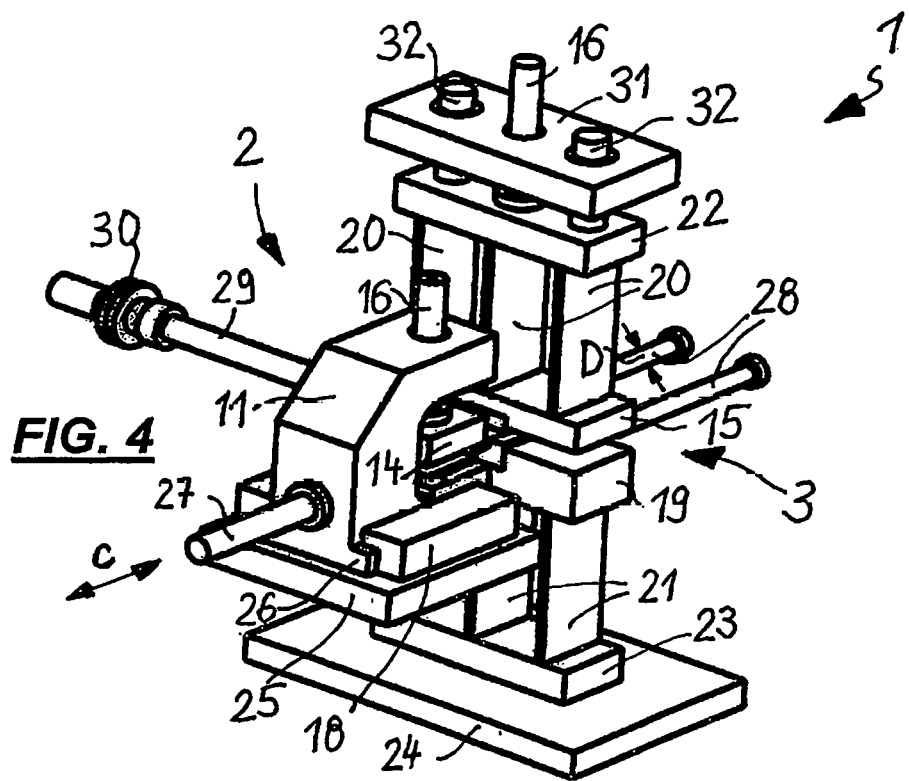
FIG. 4 shows a perspective view of the linear friction welding machine from FIG. 1, in a position rotated anticlockwise by approximately 90° compared with the view from FIG. 2.

The travel actuation for the upsetting unit 2 is carried out via an operating rod 27 which in its turn is again operated via a hydraulic cylinder (not shown in the figures) in the direction of the arrow c (cf. FIGS. 1 and 4). This direction c corresponds to the linear travel direction of the upsetting unit 2 in the direction toward the oscillator unit 3 or away from this.

The orientation of the upsetting unit 2 and of the oscillator unit 3, relative to each other, is selected so that the workpieces 10 accommodated in the clamping holders 4 and 5 are oriented with each other by their facing end surfaces 12 and 13 in an axially aligning and cross sectionally conforming manner, wherein the travel direction c of the upsetting unit 2 points parallel to the direction of the center axes of the workpieces 10. The lower detailed view of FIG. 1 shows two workpieces 10 in the form of two halves of a chain link, which are to be welded, in their relative relationship with each other when they are held in the clamping holders 4 and 5 before the welding process.

The lower holder 19 of the holder part 8 of the oscillator unit 3, on its side opposite the upsetting unit 2, is rigidly fastened to a section of the machine frame 24 in the travel direction c of the upsetting unit 2 via two round bar-like supports 28 which are parallel to each other, wherein the fastening of the bars 28 to the holder 19 is also carried out in a rigid manner.

Transversely to the travel direction c of the upsetting unit 2, the holder 19 of the oscillator unit 3 is connected via a horizontally lying actuating rod 29 to an oscillator device (again, not shown in the figures) in the form of a hydropulsator fastened to the machine frame with the interposition of a suitable coupling 30, via which a back and forth oscillating movement can be transmitted to the holder 19 in the direction of the arrow d (FIGS. 2 and 3).

The oscillating direction d is oriented perpendicularly to the orientation of the supports 28 and also to the direction c of the linear adjustment movement of the upsetting unit 2. In this case, use is preferably made of a hydropulsator the amplitude and frequency of which are adjustable and which preferably operate with an adjustable maximum amplitude or 2.5 mm and with an adjustable maximum frequency of 100 Hz. In a test machine, the deflection force of the hydropulsator in this case was 7.7 KN with a deflection of the holder of 1.5 mm and 13.8 KN with a deflection of 2.5 mm.

The vertical supports 20 and 21 and also the horizontal supports 28 on the oscillator unit 3 are designed so that during actuation of the holder 19 by means of the hydropulsator via the actuating rod 29 in the oscillating direction d, that is to say perpendicularly to the travel direction c of the upsetting unit 2, they can bend in an elastically flexible manner, wherein their rigid fastenings on the support block 23 or the machine frame 24 remain unaltered.

The upper holder 22, to which the upper ends of the three upper vertical supports 20 are fastened and which in its turn is connected to the upper operating rod 16, can be lifted in the upward direction by travel of the latter in order to lift the holder 15, which supports the upper cover part 9 of the oscillator unit 3, in the upward direction together with this and as a result to allow access to the workpiece 10 which is seated in the lower holder part 8 of the clamping holder 5. During this lifting movement of the upper holder 22, this is guided via two parallel guide rods 32 attached to its upper side, each of which passes through its associated guide opening in a stationary guide plate 31, in which guide opening each guide rod is movably guided during a lifting and lowering movement of the holder 22. For this purpose, in FIG. 3 the guide plate 31 is shown locally sectioned in order to illustrate its association with the operating rod 16 and with the guide rods 32.

The vertical upper supports 20 and lower supports 21 are attached in the oscillator unit 3 so that each upper vertical support 20 aligns with a lower vertical support 21. In this case, they are designed in the form of a longitudinal rail with two oppositely disposed large lateral surfaces of a width A and a length L (FIG. 1), which are interconnected via narrow sides with a width B (FIG. 2). By designing the width B of the narrow sides in such a way that the width A of the large lateral surfaces is very much larger than B, preferably at least eight to twelve times larger than this, it is ensured that in the design of the vertical supports 20, 21 from a suitable elastically bendable material, such as steel, the bending resistance of these rail-like supports 20, 21 in the oscillating direction d is relatively low and these supports in this case behave in a flexible manner in this bending direction, whereas in the case of a force application in the travel direction c of the upsetting unit, as it occurs during the pressing on of the two workpieces 10 against each other by their facing end surfaces 12 and 13 and acts upon the oscillator unit 3, a bending or buckling of the vertical supports 20, 21 in this direction perpendicularly to the oscillating direction d meets a very large resistance, wherein a bending of the vertical supports 20, 21 in the direction c under the influence of the occurring forces which are to be supported does not occur.

Added to this is also the fact that the horizontal supports 28 in the form of round bars with a diameter of D (FIG. 4) and a bar length of E (FIG. 1) effect a very strong support in the travel direction c of the upsetting unit 2 because they are arranged parallel to this direction and therefore are loaded during the occurrence of forces in the direction c of their longitudinal axis, whereas during lateral deflections in the oscillating direction d a relatively flexible bending behavior exists.

The vertical supports 20 and 21 in rail form and also the supports 28 in the form of round bars can consist of any material, which is suitable for the specified bending behavior, and of any shape, but are most preferably produced from a suitable steel which has durable mechanical spring characteristics and over a long period of use also operates in a reliable and wear-free manner in the sense of a flexible spring.

If now two workpieces 10 are to be welded to each other using the linear friction welding machine 1 depicted in the figures, first of all the workpiece 10 clamped in the clamping holder 4 of the upsetting unit 2 is moved via the upsetting unit 2 linearly against the facing end surface 13 of the workpiece 10 clamped in the oscillator unit 3 until the end surfaces 12 and 13 of the two clamped workpieces 10 are pressed against each other (cf. FIG. 1, lower detailed view). In the process, the upsetting unit 2 is moved toward the oscillator unit 3 so that the pressing on force of the workpiece 10 clamped in the upsetting unit 2 against the workpiece 10 clamped in the oscillator unit 3 reaches a predetermined value which is selected depending on the type of steel of the two workpieces 10 which are to be welded and is frequently selected within a range of between 30 N/mm² and 50 N/mm². If the two workpieces 10 are pressed against each other, the workpiece 10 which is clamped in the clamping holder 5 of the oscillator unit 3 is set in a corresponding oscillation (cf. arrow d in FIGS. 2 and 3) by activation of the hydropulsator. As a result of the relative movement between both workpieces 10 which occurs in the friction surface in the process, of which only the workpiece 10 clamped tight in the oscillator unit 3 executes the oscillating movement, an increasing heating of the material in the friction zone is carried out, wherein at the same time the upsetting unit 2, for maintaining the pressing on pressure and for compensating the softening conditions which occur during the heating, is moved in the direction toward the oscillator unit 3 and in the process is moved in a controlled manner inside a predetermined force window.

Upon reaching a predetermined distance marker, which is attached to the baseplate 25 or to a holder 18, the movement of the upsetting unit 2 is terminated and, maintaining the pressing on pressure of the two workpieces 10 against each other, the oscillator device in the form of a hydropulsator is also stopped over three to four oscillations. After that, the upsetting unit 2 pauses over a short predetermined time period, e.g. 5 sec., after which the upper cover parts 7 and 9 of the clamping holders 4 and 5 on the upsetting unit 2 and on the oscillator unit 3 are moved vertically upward. Then, the upsetting unit 2 is moved away in the direction from the oscillator unit 3 and the welded finished product is removed, for example manually or by means of a suitable gripper device.

The position of the distance marker, at which the upsetting unit 2 finishes its pressing on movement against the workpiece 10 clamped in the oscillator unit 3, is selected so that the heating process, which up to then had taken place between the two workpieces 10, in the friction surface as a result of the oscillation has led to a sufficiently "pasty" form of the material at the abutment point. After cessation of the oscillating movement of the oscillator unit 3, the upsetting unit 2, by a predetermined pressing on force, upsets the workpiece 10 held in it onto the other workpiece. In the process, the pasty material is pressed out to the side from the abutment point in the course of this friction welding until the end cross sections of both workpieces 10 are completely welded to each other.

The depicted linear friction welding machine 1 is provided with a central control device, not shown in the figures, which controls all the processes to be carried out when using the machine so that the desired linear friction welding of the workpieces 10 is achieved while observing the established individual specifications (value of the pressing on force, maneuvering away of the upsetting unit, activation of the hydropulsator inter alia).

The invention claimed is:

1. A linear friction welding machine comprising: an upsetting unit and an oscillator unit, each of which has a clamping holder for a workpiece and both clamping holders are provided so that workpieces clamped there are held with their surfaces to be welded facing each other and aligned with each other, wherein the clamping holder of the upsetting unit can move linearly relative to that of the oscillator unit and the oscillator unit can move back and forth in an oscillating direction perpendicularly to a travel direction of the upsetting unit and is rigidly fastened to ends of vertical and horizontal supports, the other ends of which are rigidly anchored on support bodies, wherein the supports can be elastically deflected in the oscillating direction and have a buckling safety during loading of the clamping holders in the travel direction of the upsetting unit, corresponding to a ratio of buckling force to effective force at least within a range of between 5 and 10.

2. The linear friction welding machine as claimed in claim 1, wherein the vertical supports comprise rail-like beams.

3. The linear friction welding machine as claimed in claim 1, wherein the horizontal supports comprise support bars.

4. The linear friction welding machine as claimed in claim 1, wherein the vertical supports comprise two vertical supports which are parallel to each other and the horizontal supports comprise two horizontal supports which are parallel to each other.

5. The linear friction welding machine as claimed in claim 1, wherein the supports consist of steel.

6. The linear friction welding machine as claimed in claim 1, wherein the clamping holder of the oscillator unit is vertically supported both in the downward direction as well as in the upward direction by the vertical supports.

7. The linear friction welding machine as claimed in claim 1, wherein the clamping holder of the upsetting unit is attached to a support bracket which is configured to move linearly relative to the clamping holder of the oscillator unit.

8. The linear friction welding machine as claimed in claim 1, wherein each clamping holder comprises a lower holder part and an upper cover part, between which an accommodated workpiece can be clamped in a non-positively and/or positively locking manner.

9. The linear friction welding machine as claimed in claim 8, wherein the upper cover part of each clamping holder can travel vertically in the upward direction so as to allow insertion or removal of a workpiece.

10. The linear friction welding machine as claimed in claim 8, wherein both the lower holder part as well as the upper cover part of the clamping holder of the oscillator unit are connected to vertical supports and the lower holder part is also connected to the horizontal supports.

11. The linear friction welding machine as claimed in claim 1, wherein both the lower holder part of the clamping holder of the oscillator unit is connected to a hydraulic pulsator for initiating the oscillating translational movement.

12. The linear friction welding machine as claimed in claim 11, wherein the hydraulic pulsator is connected to the lower holder part of the clamping holder of the oscillator unit via a connecting rod which is oriented in the oscillating direction.

13. The linear friction welding machine as claimed in claim 11, wherein the hydraulic pulsator is configured to operate with an adjustable amplitude or 2.5 mm maximum and an adjustable frequency of 100 Hz maximum.

14. The linear friction welding machine as claimed in claim 9, wherein the upper cover part of each clamping holder, for its vertical travel, is connected via an operating rod to a hydraulic operating cylinder which is attached to a machine frame of the linear friction welding machine.

15. The linear friction welding machine as claimed in claim 14, wherein the vertical supports of the upper cover part of the clamping holder of the oscillator unit are rigidly anchored on a common support body which in its turn is fastened on the operating rod for the vertical travel of the upper cover part of the clamping holder.

16. The linear friction welding machine as claimed in claim 15, wherein the support bodies of the vertical and horizontal supports of the lower holder part of the oscillator unit are formed of the machine frame or are supported directly on the machine frame.

17. The linear friction welding machine as claimed in claim 1, wherein the upsetting unit, for its linear travel, is connected to a hydraulic operating cylinder via which a workpiece held in the clamping holder of the upsetting unit can be pressed, under an adjustable pressing on force, against a workpiece held in the clamping holder of the oscillator unit.

18. The linear friction welding machine as claimed in claim 17, wherein the pressing-on pressure is between 10 $N/mm^2$ and 250 $N/mm^2$.

19. The linear friction welding machine as claimed in claim 1, further comprising a central control device for controlling all operating sequences during operation of the machine.

20. The linear friction welding machine as claimed in claim 18, wherein the pressing-on pressure is between 30 $N/mm^2$ and 50 $N/mm^2$.

* * * * *